US012033788B2

(12) United States Patent
Shimoda et al.

(10) Patent No.: US 12,033,788 B2
(45) Date of Patent: Jul. 9, 2024

(54) ELECTRONIC COMPONENT

(71) Applicant: Murata Manufacturing Co., Ltd., Kyoto-fu (JP)

(72) Inventors: Yuta Shimoda, Nagaokakyo (JP); Mitsuru Yamauchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/508,640

(22) Filed: Oct. 22, 2021

(65) Prior Publication Data

US 2022/0051844 A1 Feb. 17, 2022

Related U.S. Application Data

(63) Continuation of application No. 17/166,862, filed on Feb. 3, 2021, which is a continuation of application (Continued)

(30) Foreign Application Priority Data

Sep. 8, 2016 (JP) ................................ 2016-175582

(51) Int. Cl.
*H01F 5/00* (2006.01)
*H01F 17/00* (2006.01)
(Continued)

(52) U.S. Cl.
CPC ......... *H01F 27/29* (2013.01); *H01F 17/0013* (2013.01); *H01F 27/2804* (2013.01);
(Continued)

(58) Field of Classification Search
CPC .................................................. H01F 27/2804
(Continued)

(56) References Cited

U.S. PATENT DOCUMENTS 5,652,561 A 7/1997 Inoh et al.
9,287,031 B2 * 3/2016 Lee .......................... H01F 5/00
(Continued)

FOREIGN PATENT DOCUMENTS

CN 103219129 A 7/2013
JP 2010-165975 A 7/2010
JP 2014-039036 A 2/2014

OTHER PUBLICATIONS

English transition of JP2010165975 (Year: 2010).*
(Continued)

*Primary Examiner* — Ronald Hinson
(74) *Attorney, Agent, or Firm* — Studebaker & Brackett PC

(57) ABSTRACT

An electronic component includes an element body including two end surfaces opposite to each other and a bottom surface connected between the two end surfaces. A coil is provided in the element body and an external electrode is provided in the element body. In a first cross-section intersecting with the two end surfaces and the bottom surface of the element body, the external electrode has a first portion extending along a first surface that is one of the end surface and the bottom surface of the element body. The coil is disposed such that an outer circumferential edge of the coil faces the first surface of the element body. A shortest distance between the outer circumferential edge of the coil and the first surface of the element body is smaller than a minimum width of the first portion in a direction orthogonal to the first surface.

9 Claims, 6 Drawing Sheets

Related U.S. Application Data

No. 15/664,382, filed on Jul. 31, 2017, now Pat. No. 10,943,727.

(51) Int. Cl.
*H01F 27/28* (2006.01)
*H01F 27/29* (2006.01)

(52) U.S. Cl.
CPC ... *H01F 27/292* (2013.01); *H01F 2017/0073* (2013.01); *H01F 2027/2809* (2013.01)

(58) Field of Classification Search
USPC .......................................................... 336/200
See application file for complete search history.

(56) References Cited

U.S. PATENT DOCUMENTS

| | | | | |
|---|---|---|---|---|
| 10,943,727 | B2 | 3/2021 | Shimoda et al. | |
| 2012/0069506 | A1 | 3/2012 | Lai et al. | |
| 2013/0187744 | A1 | 7/2013 | Seko et al. | |
| 2014/0253277 | A1* | 9/2014 | Takezawa | H01F 17/0013 336/200 |
| 2015/0371753 | A1* | 12/2015 | Lee | H01F 27/292 336/200 |
| 2016/0099100 | A1* | 4/2016 | Park | H01F 17/0013 336/200 |
| 2017/0301453 | A1* | 10/2017 | Jo | H01F 17/0013 |

OTHER PUBLICATIONS

An Office Action; "Notification of Reasons for Refusal," Mailed by the Japanese Patent Office on Jan. 29, 2019, which corresponds to Japanese Patent Application No. 2016-175582 and is related to U.S. Appl. No. 15/664,382; with English language translation.

* cited by examiner

ELECTRONIC COMPONENT

CROSS REFERENCE TO RELATED APPLICATIONS

The present application is a Continuation of U.S. patent application Ser. No. 17/166,862 filed Feb. 3, 2021, which is a Continuation of U.S. patent application Ser. No. 15/664,382 filed Jul. 31, 2017, which claims benefit of priority to Japanese Patent Application 2016-175582 filed Sep. 8, 2016, the entire content of which is incorporated herein by reference.

TECHNICAL FIELD

The present disclosure relates to an electronic component.

BACKGROUND

Conventional electronic components include an electronic component described in Japanese Laid-Open Patent Publication No. 2014-39036. This electronic component has an element body including a bottom surface, a coil provided in the element body, and an external electrode provided in the element body and electrically connected to the coil. The external electrode is embedded in the element body and exposed from the bottom surface of the element body.

SUMMARY

Problem to be Solved by the Disclosure

It was found out that the following problem exists when the conventional coil component as described above is actually manufactured and used. First, from the viewpoint of manufacturing efficiency, such an electronic component includes a mother laminated body forming step of forming a plurality of portions serving as electronic components in a matrix shape, and a cutting step of separating a formed mother laminated body into individual pieces each corresponding to an electronic component. External electrodes of the electronic components are formed in advance at the mother laminated body forming step, and are exposed from bottom surfaces of element bodies while leaving necessary portions in the element bodies at the cutting step. In this case, if a cut deviation occurs at the cutting step, an external electrode is scraped off so that the external electrode is reduced in embedded amount in an element body.

When the embedded amount in an element body is reduced in this way, a contact area between the external electrode and the element body is reduced, and the adhesivity between the external electrode and the element body decreases. As a result, if stress is applied to the electronic component during or after mounting of the electronic component on a board, peeling may occur between the external electrode and the element body. Therefore, the fixing strength of the electronic component to the board cannot be ensured so that the resistance of the electronic component against deflection of the board cannot be secured. Additionally, even in such a state of reduced adhesivity between the external electrode and the element body, the external electrode is embedded in the element body and the shape exposed on the bottom surface of the element body does not change, so that the electronic component in the state of reduced adhesivity cannot be sorted by appearance. Thus, the electronic component being in this state is revealed only when a problem occurs after mounting on a board, which increases a risk of occurrence of defects in the market.

Therefore, a problem to be solved by the present disclosure is to provide an electronic component capable of reducing the risk of occurrence of defects in the market.

Solutions to the Problems

To solve the problem, an aspect of the present disclosure provides an electronic component comprising:

- an element body including two end surfaces opposite to each other and a bottom surface connected between the two end surfaces;
- a coil provided in the element body; and
- an external electrode provided in the element body and electrically connected to the coil, wherein
- in a first cross-section intersecting with the two end surfaces and the bottom surface of the element body,
- the external electrode has a first portion extending along a first surface that is one of the end surface and the bottom surface of the element body, wherein the first portion is embedded in the element body and exposed from the first surface, wherein
- the coil is disposed such that an outer circumferential edge of the coil faces the first surface of the element body, and wherein
- a shortest distance between the outer circumferential edge of the coil and the first surface of the element body is smaller than a minimum width of the first portion in a direction orthogonal to the first surface.

According to the electronic component, the risk of occurrence of defects in the market can be reduced.

In an embodiment of the electronic component,

- in the first cross-section of the element body,
- the external electrode has a second portion extending along a second surface that is the other of the end surface and the bottom surface of the element body, the second portion is embedded in the element body and exposed from the second surface,
- the coil is disposed such that the outer circumferential edge of the coil faces the second surface of the element body, and
- a shortest distance between the outer circumferential edge of the coil and the second surface of the element body is smaller than a minimum width of the second portion in a direction orthogonal to the second surface.

According to the embodiment, the risk of occurrence of defects in the market can further be reduced.

In an embodiment of the electronic component,

- in the first cross-section of the element body,
- a minimum width a1 of the first portion and an overlapping width b2 between the coil and the first portion satisfy $(1/3)\times a1 \le b2$.

The overlapping width b2 between the coil and the first portion in this case refers to a width in the direction orthogonal to the first surface of the portion in which the coil and the first portion overlap with each other in the direction along the first surface.

According to the embodiment, the acquisition efficiency of the L-value and Q-value is further improved.

In an embodiment of the electronic component,

- in the first cross-section of the element body,
- a minimum width c1 of the second portion and an overlapping width d2 between the coil and the second portion satisfy $(1/3)\times c1 \le d2$.

The overlapping width d2 between the coil and the second portion in this case refers to a width in the direction orthogonal to the second surface of the portion in which the coil and the second portion overlap with each other in the direction along the second surface.

According to the embodiment, the acquisition efficiency of the L-value and Q-value is further improved.

In an embodiment of the electronic component, in the first cross-section of the element body, a minimum width a1 of the first portion and a shortest distance b1 between the outer circumferential edge of the coil and the first surface of the element body satisfy $b1<(2/3)\times a1$.

According to the embodiment, the acquisition efficiency of the L-value and Q-value is further improved.

In an embodiment of the electronic component, in the first cross-section of the element body, a minimum width c1 of the second portion and a shortest distance d1 between the outer circumferential edge of the coil and the second surface of the element body satisfy $d1<(2/3)\times c1$.

According to the embodiment, the acquisition efficiency of the L-value and Q-value is further improved.

In an embodiment of the electronic component, in the first cross-section of the element body, an overlapping width b2 between the coil and the first portion satisfies $b2\geq 3$ μm.

According to the embodiment, a reduction of the embedded amount of the first portion of the external electrode to around 3 μm can be determined from the appearance of the electronic component.

In an embodiment of the electronic component, in the first cross-section of the element body, an overlapping width d2 between the coil and the second portion satisfies $d2\geq 3$ μm.

According to the embodiment, a reduction of the embedded amount of the second portion of the external electrode to around 3 μm can be determined from the appearance of the electronic component.

In an embodiment of the electronic component, an axis of the coil intersects with the first cross-section of the element body.

According to the embodiment, a proportion of magnetic fluxes generated by the coil and blocked by the first portion of the external electrode can be reduced.

In an embodiment of the electronic component, the element body is made up of a plurality of insulating layers laminated in a direction intersecting with the first cross-section of the element body, and the coil includes a coil conductor layer wound on the insulating layers.

According to the embodiment, the electronic component can be reduced in size and height.

In an embodiment of the electronic component, the coil has a configuration in which a plurality of the coil conductor layers electrically connected to each other in series and having the number of turns less than one is laminated.

According to the embodiment, the coil can be formed into a helical shape.

In an embodiment of the electronic component, the external electrode is made up of two electrodes that are a first external electrode and a second external electrode respectively electrically connected to one end and the other end of the coil, and the first external electrode is exposed from one of the two end surfaces and the bottom surface while the second external electrode is exposed from the other of the two end surfaces and the bottom surface.

According to the embodiment, the electronic component can be configured such that both of the two L-shaped external electrodes are exposed on the bottom surface serving as a mounting surface.

In an embodiment of the electronic component, the external electrode has a configuration in which a plurality of external electrode conductor layers embedded in the element body is laminated, and the external electrode conductor layers have portions extending along the end surface and the bottom surface.

According to the embodiment, the electronic component can be reduced in size.

Effect of the Disclosure

The electronic component of the present disclosure can reduce the risk of occurrence of defects in the market.

DETAILED DESCRIPTION

An electronic component considered as a form of the present disclosure will now be described in detail with a shown embodiment.

Embodiment

Figure 1:
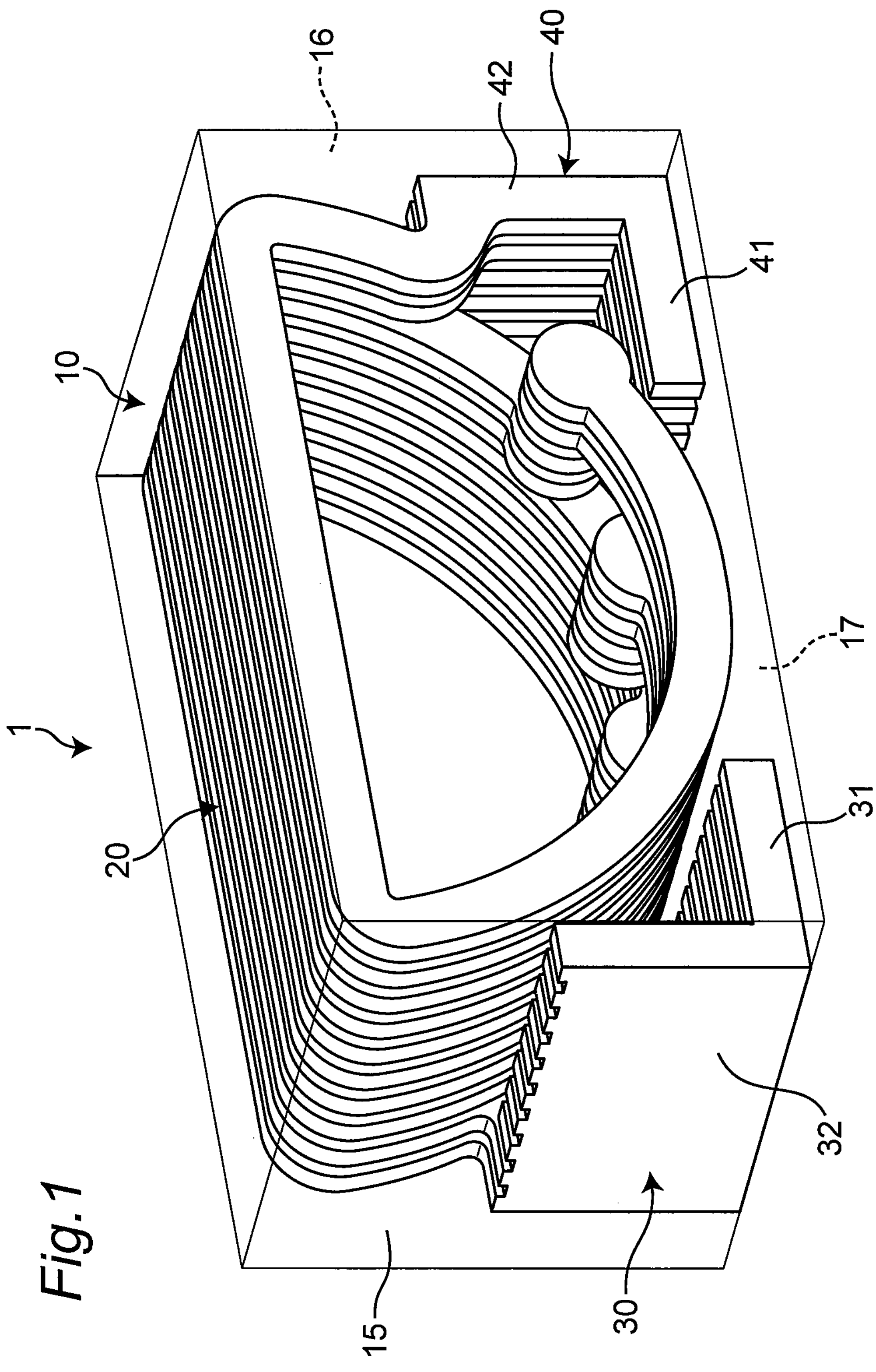
FIG. 1 is a transparent perspective view of an embodiment of an electronic component.
Figure 2:
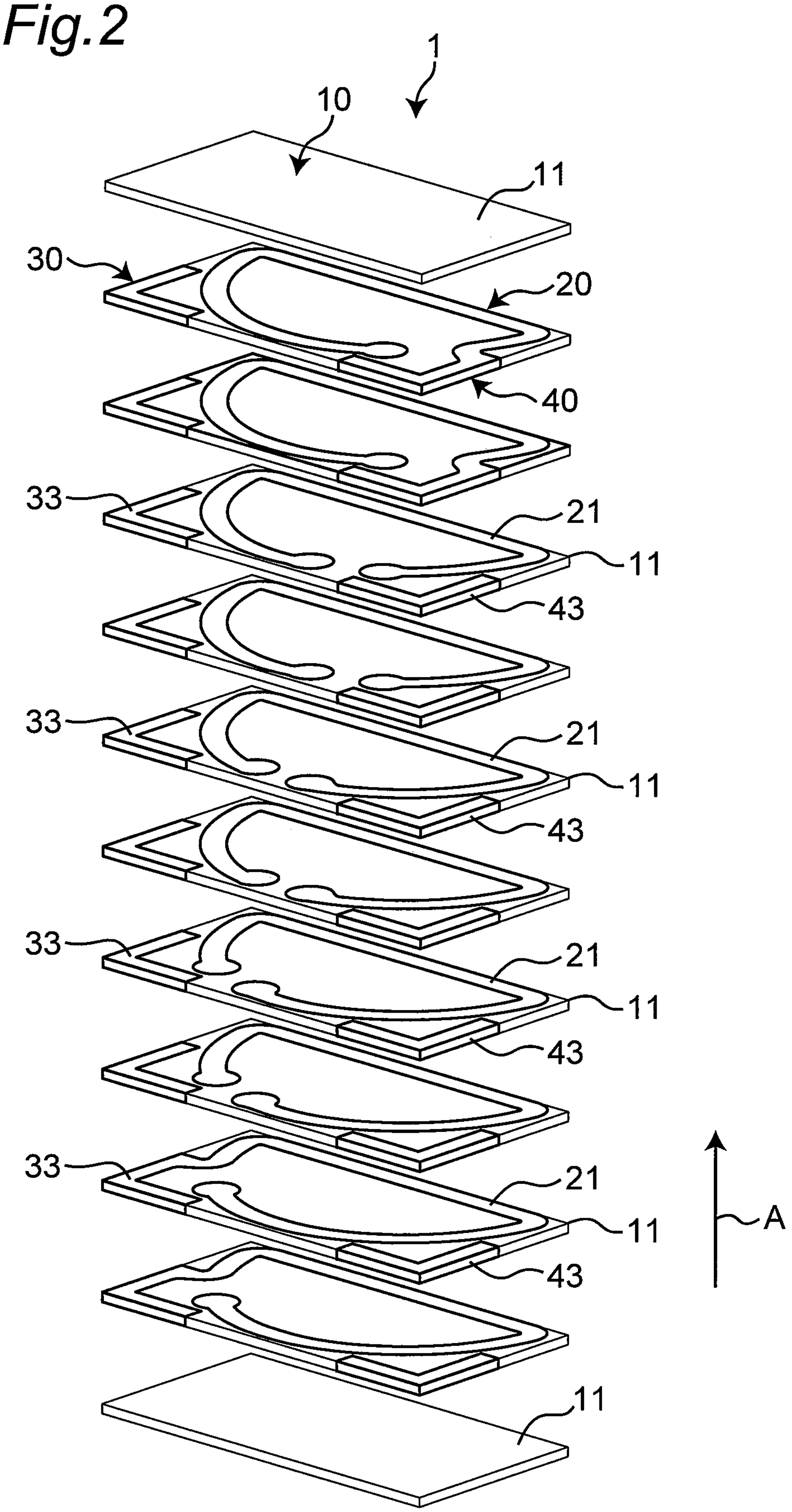
FIG. 2 is an exploded perspective view of the electronic component.
Figure 3:
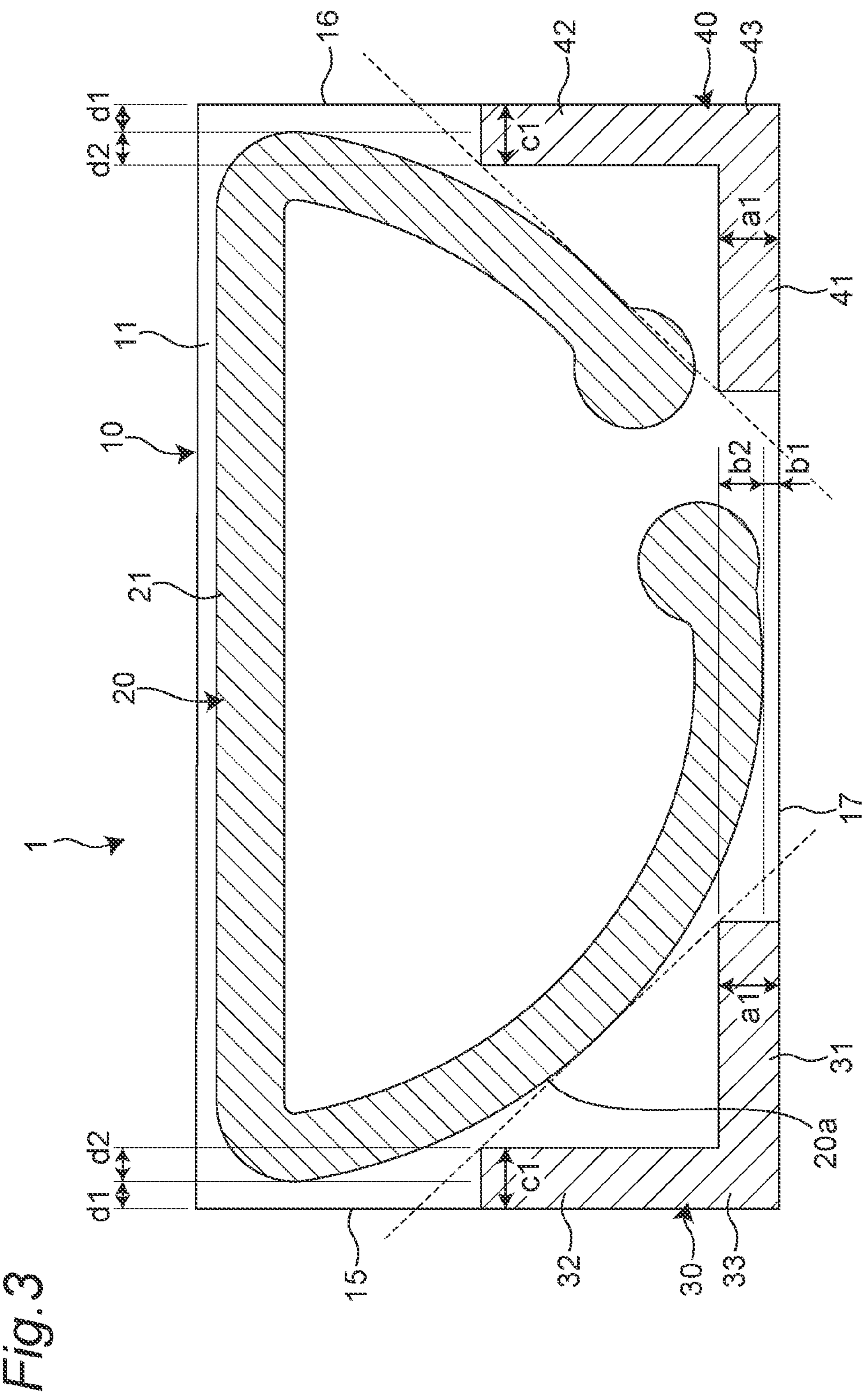
FIG. 3 is a cross-sectional view of the electronic component.

FIG. 1 is a transparent perspective view of an embodiment of an electronic component. FIG. 2 is an exploded perspective view of the electronic component. FIG. 3 is a cross-sectional view of the electronic component. As shown in FIGS. 1, 2, and 3, an electronic component 1 has an element body 10, a helical coil 20 provided inside the element body 10, and a first external electrode 30 and a second external electrode 40 provided in the element body 10 and electrically connected to the coil 20. Although depicted as being transparent in FIG. 1 such that a structure can easily be understood, the element body 10 may be semitransparent or opaque.

The electronic component 1 is electrically connected via the first and second external electrodes 30, 40 to a wiring of a circuit board not shown. The electronic component 1 is used as an impedance matching coil (matching coil) of a high-frequency circuit, for example, and is used for an electronic device such as a personal computer, a DVD player, a digital camera, a TV, a portable telephone, automotive electronics, and medical/industrial machines. However, the use application of the electronic component 1 is not limited thereto and can also be used for a tuning circuit, a filter circuit, and a rectification smoothing circuit, for example.

The element body 10 is formed by laminating a plurality of insulating layers 11. The insulating layers 11 are made of, for example, a material mainly composed of borosilicate glass or a material such as ferrite and resin. In the element body 10, an interface between the multiple insulating layers 11 may not be clear because of firing etc. The element body 10 is formed into a substantially rectangular parallelepiped shape. The surface of the element body 10 has a first end surface 15, a second end surface 16 located on the side opposite to the first end surface 15, and a bottom surface 17 connected between the first end surface 15 and the second end surface 16. The first end surface 15 and the second end surface 16 are opposite to each other in a direction orthogonal to a lamination direction A of the insulating layers 11. It is noted that "orthogonal" in the present application is not limited to a strictly orthogonal relationship and includes a substantially orthogonal relationship in consideration of a realistic variation range.

A cross-section of FIG. 3 shows an upper surface of the fourth insulating layer 11 from the top of FIG. 2 as an example of a first cross-section of this embodiment, and the cross-section is orthogonal to the first end surface 15, the second end surface 16, and the bottom surface 17 of the element body 10. In this case, the plurality of the insulating layers 11 are laminated in a direction orthogonal to the cross-section.

The first external electrode 30 and the second external electrode 40 are made of a conductive material such as Ag, Cu, Au, and an alloy mainly composed thereof, for example. The first external electrode 30 has an L shape provided over the first end surface 15 and the bottom surface 17. The second external electrode 40 has an L shape provided over the second end surface 16 and the bottom surface 17.

The first external electrode 30 and the second external electrode 40 have a configuration in which pluralities of external electrode conductor layers 33, 43 embedded in the element body 10 are laminated. The external electrode conductor layers 33 have an L shape with portions extending along the first end surface 15 and the bottom surface 17, and the external electrode conductor layers 43 have an L shape with portions extending along the second end surface 16 and the bottom surface 17. As a result, since the external electrodes 30, 40 can be embedded in the element body 10, the electronic component can be reduced in size as compared to a configuration in which the external electrodes are externally attached to the element body 10. Additionally, the coil 20 and the external electrodes 30, 40 can be formed in the same steps, so that variations in the positional relationship between the coil 20 and the external electrodes 30, 40 can be reduced to decrease variations in electrical characteristics of the electronic component 1.

The coil 20 is made of the same conductive material as the first and second external electrodes 30, 40, for example. The coil 20 is helically wound along the lamination direction A of the insulating layers 11. One end of the coil 20 is in contact with the first external electrode 30 and the other end of the coil 20 is in contact with the second external electrode 40. In this embodiment, the coil 20 and the first and second external electrodes 30, 40 are integrated without a clear boundary; however, this is not a limitation and the coil and the external electrodes may be made of different materials or by different construction methods so that boundaries may exist.

An axis of the coil 20 is orthogonal to the first cross-section of the element body 10. The axis of the coil 20 means the central axis of the helical shape of the coil 20.

The coil 20 includes a plurality of coil conductor layers 21 wound on the insulating layers 11. Since the coil 20 is made up of the coil conductor layers 21 that can be microfabricated in this way, the electronic component 1 can be reduced in size and height. The coil conductor layers 21 adjacent in the lamination direction A are electrically connected in series through via conductors penetrating the insulating layers 11 in the thickness direction. The plurality of the coil conductor layers 21 are electrically connected to each other in series in this way to constitute a helix. Specifically, the coil 20 has a configuration in which the plurality of the coil conductor layers 21 electrically connected to each other in series and having the number of turns less than one is laminated, and the coil 20 has a helical shape. In this case, a parasitic capacitance generated in the coil conductor layers 21 and a parasitic capacitance generated between the coil conductor layers 21 can be reduced, and the Q-value of the electronic component 1 can be improved.

As shown in FIG. 3, in the first cross-section of the element body 10, the first external electrode 30 has a first portion 31 extending along the bottom surface 17 of the element body 10 and a second portion 32 extending along the first end surface 15 of the element body 10. In the present embodiment, the bottom surface 17 is an example of a first surface, and the first end surface 15 is an example of a second surface. The bottom surface 17 may be an example of the second surface, and the first end surface 15 may be an example of the first surface.

The first portion 31 is embedded in the element body 10 and exposed from the bottom surface 17. An exposed surface of the first portion 31 is located on the same plane as (flush with) the bottom surface 17. The second portion 32 is embedded in the element body 10 and exposed from the first end surface 15. An exposed surface of the second portion 32 is located on the same plane as (flush with) the first end surface 15.

As is the case with the first external electrode 30, the second external electrode 40 has a first portion 41 extending along the bottom surface 17 (an example of the first surface) and a second portion 42 extending along the second end surface 16 (an example of the second surface). The first portion 41 of the second external electrode 40 has the same configuration as the first portion 31 of the first external electrode 30. The second portion 42 of the second external electrode 40 has the same configuration as the second portion 32 of the first external electrode 30. In this case, the axis of the coil 20 intersects with the first cross-section. This means that the axis of the coil 20 is parallel to the direction of extension of the first portions 31, 41 and the direction of extension of the second portions 32, 42 of the first and second external electrodes 30, 40. As a result, the magnetic fluxes of the coil 20 generated near the first and second external electrodes 30, 40 become parallel to the first portion 31, 41 and the second portion 32, 42. Therefore, a proportion of the magnetic fluxes blocked by the first portion 31, 41 and the second portion 32, 42 can be reduced and an eddy current loss generated by the first and second external electrodes 30, 40 is reduced, so that a reduction in the Q value of the coil 20 can be suppressed.

Although the relationship between the first external electrode 30 and the coil 20 in the first cross-section will hereinafter be described with reference to FIG. 3, the same applies to the relationship between the second external electrode 40 and the coil 20 when the first end surface 15 defined as an example of the second surface is replaced with the second end surface 16.

The coil 20 is arranged such that an outer circumferential edge 20*a* of the coil 20 faces the bottom surface 17 and the first and second end surfaces 15, 16 of the element body 10. The outer circumferential edge 20*a* is formed into a semicircular shape. The shape of the outer circumferential edge 20*a* is not limited to a semicircular shape and may be a circular shape including an ellipse, a circular arc, a polygonal shape, or a combination thereof. The outer circumferential edge 20*a* is embedded in the element body 10 without being exposed from the bottom surface 17 and the first and second end surfaces 15, 16. The outer circumferential edge 20*a* of the coil 20 refers to an outer circumferential edge of the coil 20 viewed in the axial direction of the coil 20.

A shortest distance b1 between the outer circumferential edge 20*a* of the coil 20 and the bottom surface 17 of the element body 10 is smaller than a minimum width a1 of the first portion 31 in the direction orthogonal to the bottom surface 17.

A shortest distance d1 between the outer circumferential edge 20*a* of the coil 20 and the first end surface 15 of the element body 10 is smaller than a minimum width c1 of the second portion 32 in the direction orthogonal to the first end surface 15. Although the first portion 31 and the second portion 32 have constant line widths (rectangular shapes) to the leading ends in this embodiment, if a leading end surface of the first portion 31 on the side of the second end surface 16 or a leading end surface of the second portion 32 on the side opposite to the bottom surface 17 is, for example, curved, or inclined with respect to the bottom surface 17 or the first end surface 15, the minimum width of the portion except this leading end surface is defined as the minimum width a1.

According to the electronic component 1, in the first cross-section of the element body 10, the shortest distance b1 between the outer circumferential edge 20*a* of the coil 20 and the bottom surface 17 of the element body 10 is smaller than the minimum width a1 of the first portion 31 of the first external electrode 30 in the direction orthogonal to the bottom surface 17 of the element body 10.

Figure 4A:
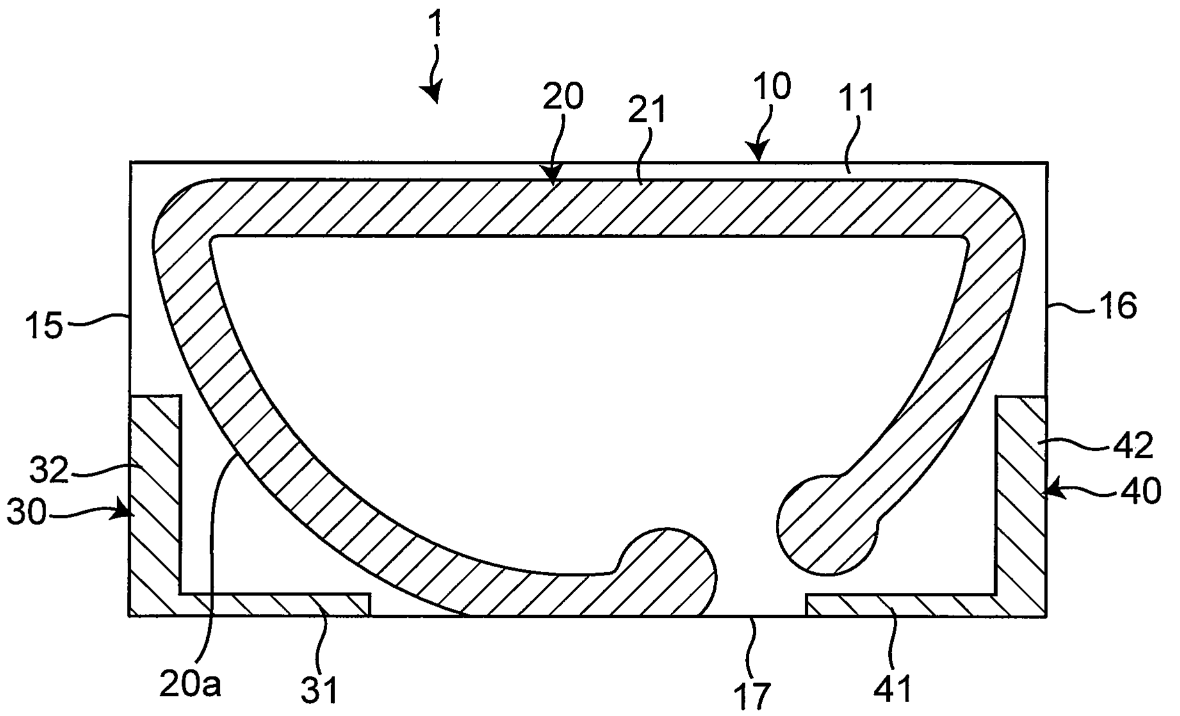
FIG. 4A is a cross-sectional view when a cut deviation occurs on the bottom surface side of an element body.
Figure 4B:
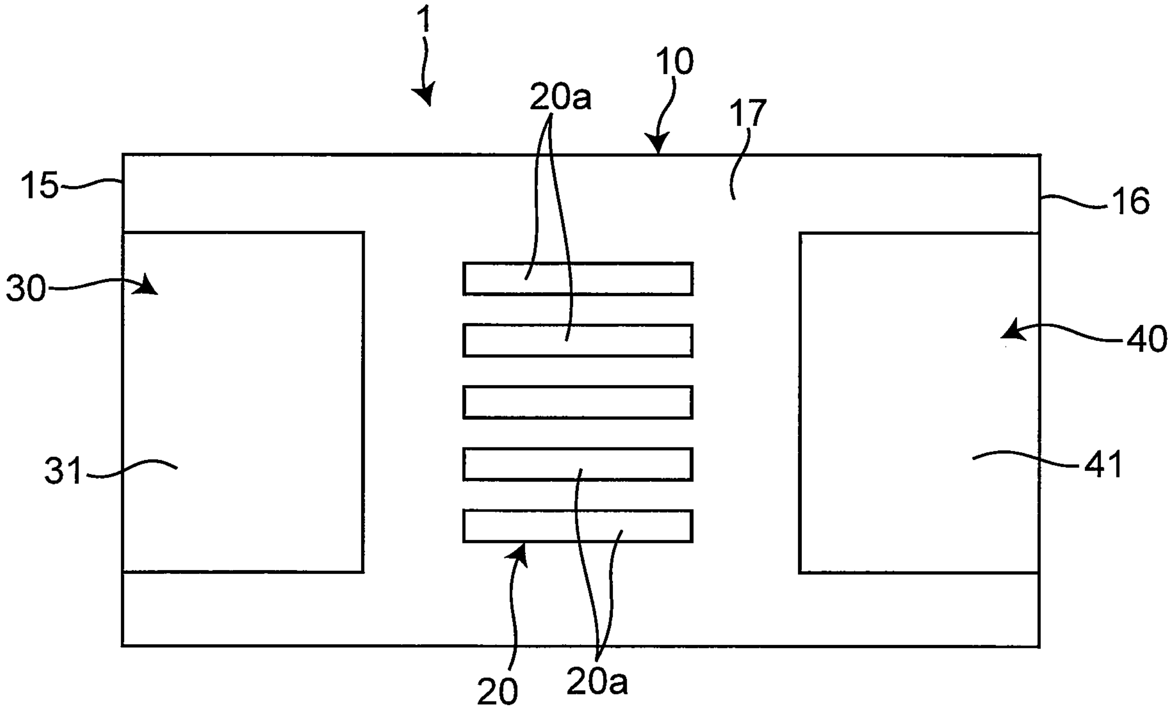
FIG. 4B is a bottom view when a cut deviation occurs on the bottom surface side of the element body.

As a result, for example, as shown in FIG. 4A, when a cut deviation amount at a cutting step exceeds a certain amount even to the extent that the first portion 31 of the external electrode 30 is not completely scraped off (to the extent that the exposed shape of the external electrode 30 on the bottom surface 17 is not changed), the outer circumferential edge 20*a* of the coil 20 is exposed on the bottom surface 17 of the element body 10. Therefore, by properly setting the cut deviation amount causing exposure of the outer circumferential edge 20*a* from the element body 10, the electronic component 1 with adhesivity reduced between the external electrode 30 and the element body 10 due to an insufficient embedded amount can be sorted by the appearance of the bottom surface 17.

As a result, the electronic component 1 with adhesivity secured between the first external electrode 30 and the element body 10 can selectively be shipped and, even when stress is applied to the electronic component 1 during or after mounting of the electronic component 1 on a board, peeling can be suppressed between the first external electrode 30 and the element body 10. Therefore, the fixing strength of the electronic component 1 to the board can be ensured, so that the resistance of the electronic component 1 against deflection of the board can be secured. Thus, according to the electronic component 1, the risk of occurrence of defects in the market can be reduced.

With regard to the appearance of the electronic component 1, a method of sorting based on exposure of the outer circumferential edge 20*a* of the coil 20 on the bottom surface 17 of the element body 10 has been described above; however, the sorting can be achieved in some cases even when the outer circumferential edge 20*a* is not completely exposed on the bottom surface 17, depending on a configuration and a material of the element body 10. For example, if the element body 10 has some optical transparency, the outer circumferential edge 20*a* can be seen through the bottom surface 17 of the element body 10 when the distance between the outer circumferential edge 20*a* and the bottom surface 17 becomes sufficiently small. Therefore, for example, by properly setting a threshold value for determining a non-defective product in an image recognition device in terms of the contrast between the outer circumferential edge 20 appearing on the bottom surface 17 and the other portion at the time of the sorting by appearance, the electronic component 1 with an insufficient embedded amount of the first external electrode 30 can be sorted. Therefore, the electronic component 1 can be sorted by appearance even in a range of the shortest distance b1 greater than zero between the outer circumferential edge 20*a* of the coil 20 and the bottom surface 17 of the element body 10.

Furthermore, since the outer circumferential edge 20*a* of the coil 20 can be brought closer to the bottom surface 17 of the element body 10 in the electronic component 1 as compared to when the shortest distance b1 is equal to or greater than the minimum width a1, the inner diameter of the coil 20 can be made larger without increasing the outer shape size. By enlarging the inner diameter of the coil 20 in this way, the acquisition efficiency of the L-value and the Q-value is improved.

According to the electronic component 1, in the first cross-section of the element body 10, the shortest distance d1 between the outer circumferential edge 20*a* of the coil 20 and the first end surface 15 of the element body 10 is smaller than the minimum width c1 of the second portion 32 of the first external electrode 30 in the direction orthogonal to the first end surface 15 of the element body 10.

Figure 5A:
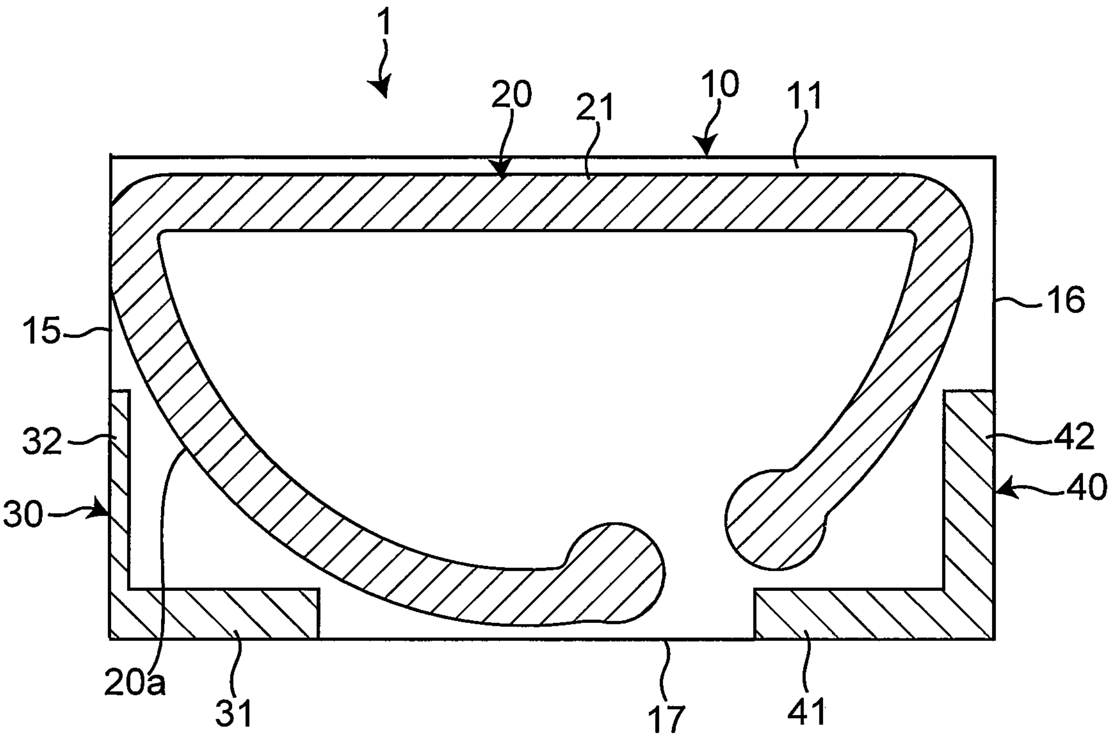
FIG. 5A is a cross-sectional view when a cut deviation occurs on the first end surface side of the element body.
Figure 5B:
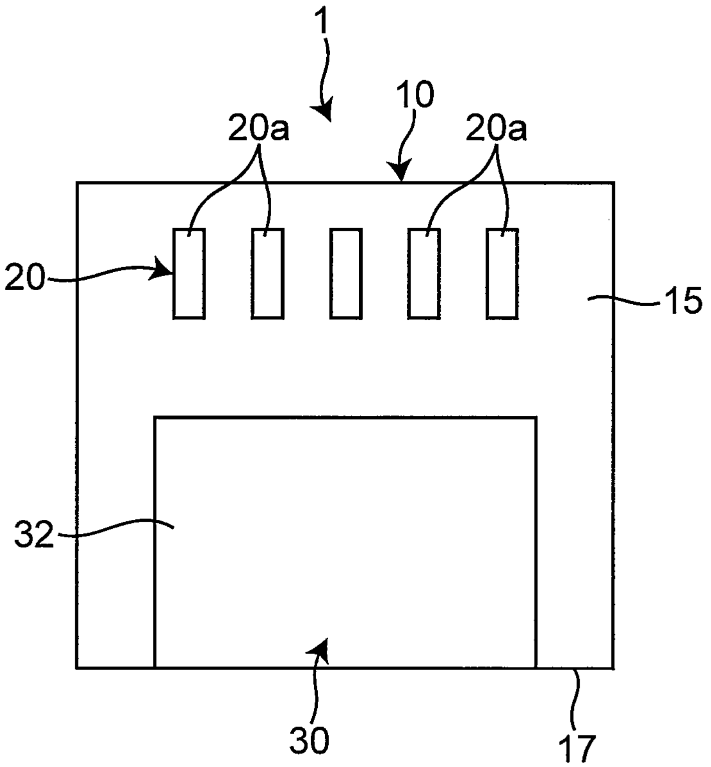
FIG. 5B is an end view when a cut deviation occurs on the first end surface side of the element body.

As a result, for example, as shown in FIG. 5A, when a cut deviation amount at the cutting step exceeds a certain amount even to the extent that the second portion 32 of the external electrode 30 is not completely scraped off (to the extent that the exposed shape of the external electrode 30 on the first end surface 15 is not changed), the outer circumferential edge 20*a* of the coil 20 is exposed on the first end surface 15 of the element body 10. Therefore, by properly setting the cut deviation amount causing exposure of the outer circumferential edge 20*a* from the element body 10, the electronic component 1 with adhesivity reduced between the external electrode 30 and the element body 10 due to an insufficient embedded amount can be sorted by the appearance of the first end surface 15.

As a result, the electronic component 1 with adhesivity secured between the first external electrode 30 and the element body 10 can selectively shipped and, even when stress is applied to the electronic component 1 during or after mounting of the electronic component 1 on a board, peeling can be suppressed between the first external electrode 30 and the element body 10. Therefore, the fixing strength of the electronic component 1 to the board can be ensured, so that the resistance of the electronic component 1 against deflection of the board can be secured. Thus, according to the electronic component 1, the risk of occurrence of defects in the market can be reduced.

In the electronic component 1, the shortest distance b1 is smaller than the minimum width a1 and the shortest distance d1 is smaller than the minimum width c1. As a result, the electronic component 1 enables the sorting by appearance of the electronic component 1 if the adhesivity between the external electrode 30 and the element body 10 decreases in terms of both the cut deviation in the direction orthogonal to the bottom surface 17 and the cut deviation in the direction orthogonal to the first end surface 15 and, therefore, the risk of occurrence of defects in the market can further be reduced.

Furthermore, since the outer circumferential edge 20*a* of the coil 20 can be brought closer to the first end surface 15 of the element body 10 in the electronic component 1 as compared to when the shortest distance d1 is equal to or greater than the minimum width c1, the inner diameter of the coil 20 can be made larger without increasing the outer shape size. By enlarging the inner diameter of the coil 20 in this way, the acquisition efficiency of the L-value and the Q-value is improved. Particularly, since the outer circumferential edge 20*a* can be brought closer to both the bottom surface 17 and the first end surface 15 of the element body 10 in the electronic component 1, the acquisition efficiency of the L-value and the Q-value is further improved.

Preferably, in the first cross-section of the element body 10, the minimum width a1 of the first portion 31 and an overlapping width b2 between the coil 20 and the first portion 31 satisfy $(1/3) \times a1 \le b2$. In this case, with respect to the embedded amount a1 in the element body 10 in the direction orthogonal to the bottom surface 17 of the external electrode 30, the shortest distance b1 between the outer circumferential edge 20*a* of the coil 20 and the bottom surface 17 of the element body 10 is smaller than $(2/3) \times a1$. Therefore, the inner diameter of the coil 20 can further be enlarged without increasing the outer shape size, and the acquisition efficiency of the L-value and Q-value is further improved.

Preferably, in the first cross-section of the element body 10, the minimum width c1 of the second portion 32 and an overlapping width d2 between the coil 20 and the second portion 32 satisfy $(1/3) \times c1 \le d2$. In this case, with respect to the embedded amount c1 in the element body 10 in the direction orthogonal to the first end surface 15 of the external electrode 30, the shortest distance d1 between the outer circumferential edge 20*a* of the coil 20 and the first end surface 15 of the element body 10 is smaller than $(2/3) \times c1$. Therefore, the inner diameter of the coil 20 can further be enlarged without increasing the outer shape size, and the acquisition efficiency of the L-value and Q-value is further improved.

It is noted that the overlapping width b2 between the coil 20 and the first portion 31 is a width in the direction orthogonal to the bottom surface 17 of the range in which the coil 20 and the first portion 31 are overlapped with each other (arranged on the same straight line) in the direction parallel to the bottom surface 17 (the first surface) in the first cross-section of the element body 10 as shown in FIG. 3. It is also noted that the overlapping width d2 between the coil 20 and the second portion 32 is a width in the direction orthogonal to the first end surface 15 of the range in which the coil 20 and the second portion 32 are overlapped with each other (arranged on the same straight line) in the direction parallel to the first end surface 15 (the second surface) in the first cross-section of the element body 10 as shown in FIG. 3.

Preferably, in the first cross-section of the element body 10, the minimum width a1 of the first portion 31 and the shortest distance b1 between the outer circumferential edge 20*a* of the coil 20 and the bottom surface 17 of the element body 10 satisfy $b1 < (2/3) \times a1$. By making the shortest distance b1 between the outer circumferential edge 20*a* of the coil 20 and the bottom surface 17 of the element body 10 smaller than a certain amount in this way, the inner diameter of the coil 20 can further be enlarged without increasing the outer shape size, and the acquisition efficiency of the L-value and Q-value is further improved.

Preferably, in the first cross-section of the element body 10, the minimum width c1 of the second portion 32 and the shortest distance b1 between the outer circumferential edge 20*a* of the coil 20 and the first end surface 15 of the element body 10 satisfy $b1 < (2/3) \times c1$. By making the shortest distance d1 between the outer circumferential edge 20*a* of the coil 20 and the first end surface 15 of the element body 10 smaller than a certain amount in this way, the inner diameter of the coil 20 can further be enlarged without increasing the outer shape size, and the acquisition efficiency of the L-value and Q-value is further improved.

Preferably, in the first cross-section of the element body 10, the overlapping width b2 between the coil 20 and the first portion 31 in the direction along the bottom surface 17 satisfies $b2 \ge 3$ μm. As a result, a reduction of the embedded amount of the first portion 31 of the first external electrode 30 to around 3 μm can be determined from the appearance of the electronic component.

Preferably, in the first cross-section of the element body 10, the overlapping width d2 between the coil 20 and the second portion 32 in the direction along the first end surface 15 satisfies $d2 \ge 3$ μm. As a result, a reduction of the embedded amount of the second portion 32 of the first external electrode 30 to around 3 μm can be determined from the appearance of the electronic component 1. If the embedded amount of the first portion 31 or the second portion 32 becomes less than 3 μm, peeling may occur between the first external electrode 30 and the element body 10.

Although the effect from the relationship between the first external electrode 30 and the coil 20 has been described, the same applies to the effect from the relationship between the second external electrode 40 and the coil 20. In this embodiment, the relationship between the second external electrode 40 and the coil is the same as the relationship between the first external electrode 30 and the coil 20; however, these relationships may be different. In particular, at least one of the first external electrode 30 and the second external electrode 40 may satisfy the relationship with the coil 20 described above.

The present disclosure is not limited to the embodiment described above and can be changed in design without departing from the spirit of the present disclosure.

Although the external electrodes 30, 40 have the first portions 31, 41 and the second portions 32, 42 in the embodiment, the electrodes may be side electrodes or bottom electrodes having only the portions corresponding to the first portions 31, 41 or the portions corresponding to the second portions 32, 42. Although the embodiment has a configuration in which both the first portions 31, 41 and the second portions 32, 42 extend in parallel with the coil axis, the eddy current loss can be reduced when at least the first portions or the second portions extend in parallel with the coil axis.

In the embodiment, in the first cross-section of the element body 10, the shortest distance b1 between the outer circumferential edge 20*a* of the coil 20 and the bottom surface 17 of the element body 10 is smaller than the minimum width a1 of the first portion 31 and the shortest distance d1 between the outer circumferential edge 20*a* of the coil 20 and the first end surface 15 of the element body 10 is smaller than the minimum width c1 of the second portion 32; however, the present disclosure is not necessarily limited to this configuration. For example, the configuration may satisfy only either the shortest distance between the outer circumferential edge of the coil and the bottom surface of the element body smaller than the minimum width of the first portion or the shortest distance between the outer circumferential edge of the coil and the first end surface of the element body smaller than the minimum width of the second portion.

In this case, when the shortest distance between the outer circumferential edge of the coil and the bottom surface of the element body is smaller than the minimum width of the first portion and the outer circumferential edge of the coil is arranged to face the bottom surface of the element body, the axis of the coil may be made orthogonal to the first end surface and the second end surface.

On the other hand, when the shortest distance between the outer circumferential edge of the coil and the first end surface of the element body is smaller than the minimum width of the second portion and the outer circumferential edge of the coil is arranged to face the first end surface of the element body, the axis of the coil may be made orthogonal to the bottom surface. Although the axis of the coil 20 is orthogonal to the first cross-section in the embodiment, the axis of the coil may at least intersect with the first cross-section.

Although the cross-section of FIG. 3 is described as an example of the first cross-section in the embodiment, the first cross-section may be another cross-section orthogonal to the first end surface, the second end surface, and the bottom surface. Specifically, the first cross-section may be any of the upper surfaces of the plurality of the insulating layers 11 on which the coil conductor layers 21 and the external electrode conductor layers 33, 43 of FIG. 2 are disposed. In the embodiment, the relationship is satisfied on all the upper surfaces (first cross-sections) of the plurality of the insulating layers 11 on which the coil conductor layers 21 and the external electrode conductor layers 33, of FIG. 2 are disposed; however, the relationship may be satisfied on only a portion of the upper surfaces (first cross-sections). Furthermore, the first cross-section is not limited to the cross-section orthogonal to the first end surface, the second end surface, and the bottom surface and may be a cross-section intersecting with the first end surface, the second end surface, and the bottom surface. Additionally, the lamination direction A is not limited to the direction orthogonal to the first cross-section and may be a direction intersecting with the first cross-section.

Although made up of the laminated coil conductor layers 21 in the embodiment, the coil 20 may be made up of a wire such as an insulation-coated copper wire etc. Although the coil 20 has a configuration in which the plurality of the coil conductor layers 21 having the number of turns less than one is laminated in the embodiment, the number of turns of the coil conductor layers 21 may be one or more. Therefore, the coil 20 may have a spiral shape.

In the embodiment, the external electrodes 30, 40 are made up of two electrodes, i.e., the first external electrodes 30 and the second external electrode 40, respectively connected to one end and the other end of the coil 20, and the first external electrode 30 is exposed from the first end surface 15 and the bottom surface 17, while the second external electrode is exposed from the second end surface 16 and the bottom surface 17. As a result, the bottom surface 17 with both the first external electrode 30 and the second external electrode 40 exposed can be used as a mounting surface facing the board.

Figure 6A:
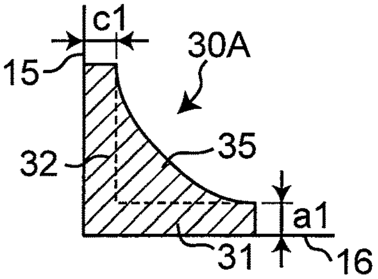
FIG. 6A is an explanatory view for explaining other shapes of an external electrode.
Figure 6B:
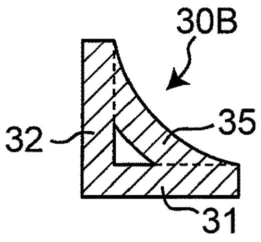
FIG. 6B is an explanatory view for explaining other shapes of an external electrode.
Figure 6C:
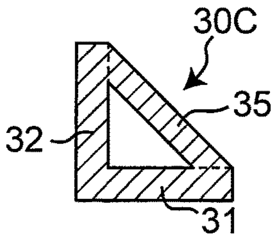
FIG. 6C is an explanatory view for explaining other shapes of an external electrode.
Figure 6D:
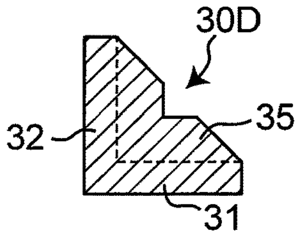
FIG. 6D is an explanatory view for explaining other shapes of an external electrode.
Figure 6E:
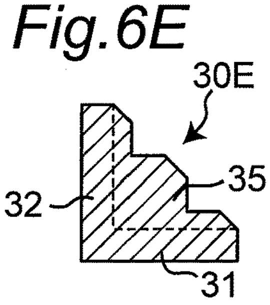
FIG. 6E is an explanatory view for explaining other shapes of an external electrode.
Figure 6F:
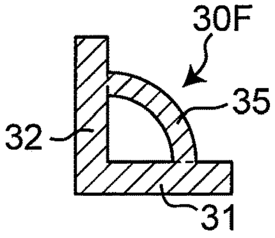
FIG. 6F is an explanatory view for explaining other shapes of an external electrode.
Figure 6G:
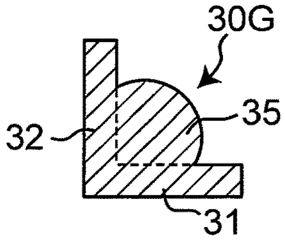
FIG. 6G is an explanatory view for explaining other shapes of an external electrode.
Figure 6H:
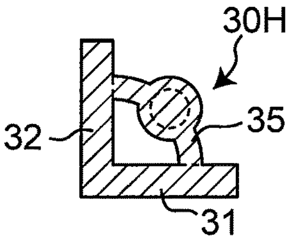
FIG. 6H is an explanatory view for explaining other shapes of an external electrode.
Figure 6I:
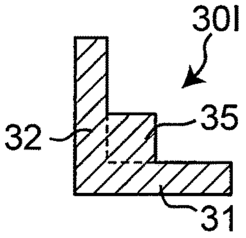
FIG. 6I is an explanatory view for explaining other shapes of an external electrode.
Figure 6J:
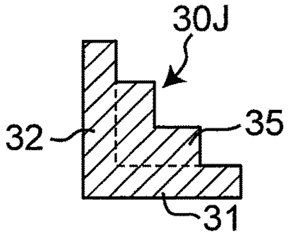
FIG. 6J is an explanatory view for explaining other shapes of an external electrode.
Figure 6K:
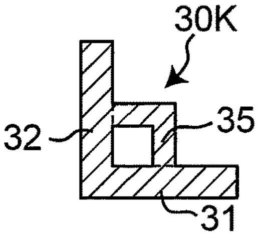
FIG. 6K is an explanatory view for explaining other shapes of an external electrode.
Figure 6L:
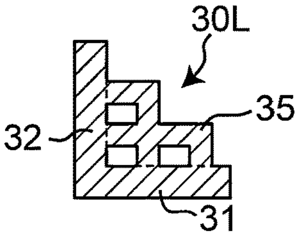
FIG. 6L is an explanatory view for explaining other shapes of an external electrode.
Figure 6M:
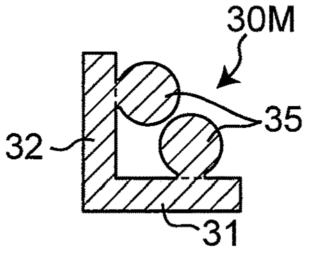
FIG. 6M is an explanatory view for explaining other shapes of an external electrode.
Figure 6N:
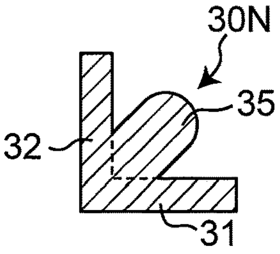
FIG. 6N is an explanatory view for explaining other shapes of an external electrode.

Although having the L shape made up of the first portions 31, 41 and the second portions 32, 42 in the embodiment, the external electrodes 30, 40 may have a shape further including a third portion as shown in FIGS. 6A to 6N. Although the shape of the first external electrode will be described with reference to FIGS. 6A to 6N, the shape of the second external electrode may be the same as or different from the first external electrode. In FIGS. 6A to 6N, the first portion 31 and the second portion 32 have the same configuration as the first external electrode 30 and therefore will not be described or will be described in a simplified manner.

As shown in FIG. 6A, a first external electrode 30A has a third portion 35 in addition to the first portion 31 and the second portion 32 having the L shape. The third portion 35 includes a concave curve connecting the leading end of the first portion 31 and the leading end of the second portion 32.

As shown in FIG. 6B, the third portion 35 of a first external electrode 30B is formed into a concave arcuate belt shape connecting the leading end of the first portion 31 and the leading end of the second portion 32. As shown in FIG. 6C, the third portion 35 of a first external electrode 30C is formed into a straight belt shape connecting the leading end of the first portion 31 and the leading end of the second portion 32.

As shown in FIG. 6D, the third portion 35 of a first external electrode 30D has an inclined surface connecting the leading end of the first portion 31 and the second portion 32 and a V-shaped cutout is formed in a center portion of the inclined surface. As shown in FIG. 6E, the third portion 35 of a first external electrode 30E has a plurality of V-shaped cutouts formed on the inclined surface.

As shown in FIG. 6F, the third portion 35 of a first external electrode 30F is formed into a convex arcuate belt shape connecting an intermediate portion of the first portion 31 and an intermediate portion of the second portion 32. As shown in FIG. 6G, the third portion 35 of a first external electrode 30G protrudes into a substantially quarter circle from a connecting part between the first portion 31 and the second portion 32. As shown in FIG. 6H, the third portion 35 of a first external electrode 30H is formed in a convex arcuate belt shape connecting the intermediate portion of the first portion 31 and the intermediate portion of the second portion 32 and has a circular portion in an intermediate portion of the arcuate belt shape.

As shown in FIG. 6I, the third portion 35 of a first external electrode 30I protrudes into a rectangular shape from the connecting part between the first portion 31 and the second portion 32. As shown in FIG. 6J, the third portion 35 of a first external electrode 30J is formed into a staircase shape.

As shown in FIG. 6K, the third portion 35 of a first external electrode 30K has a shape hollowed out inside the third portion 35 of the first external electrode 30I. As shown in FIG. 6L, the third portion 35 of a first external electrode 30L has a shape hollowed out at a plurality of positions inside the third portion 35 of the first external electrode 30J.

As shown in FIG. 6M, the third portion 35 of a first external electrode 30M includes a circular portion protruding from the intermediate portion of the first portion 31 and a circular portion protruding from the intermediate portion of the second portion 32. As shown in FIG. 6N, the third portion 35 of a first external electrode 30N has an extending portion extending along the bisector of the angle between the first portion and the second portion from the connecting part between the first portion 31 and the second portion 32 and a semicircle connected to a leading end of the extending portion.

In this case, for example, as shown in FIG. 6A, the minimum width a1 of the first portion 31 and the minimum width c1 of the second portion 32 of the external electrodes 30A to 30N are widths at the leading ends of the first portion 31 and the second portion 32, respectively. In the first external electrodes 30A to 30N, the first portion 31, the second portion 32, and the third portion 35 may have clear boundaries as completely different members, or the first portion 31, the second portion 32, and the third portion 35 may be integrated without having clear boundaries.

Example

An example of a method for manufacturing the electronic component 1 will hereinafter be described.

First, an insulating layer is formed by repeatedly applying an insulating paste mainly composed of borosilicate glass onto a base material such as a carrier film by screen printing. This insulating layer serves as an outer-layer insulating layer located outside coil conductor layers. The base material is peeled off from the insulating layer at an arbitrary step and does not remain in the electronic component state.

Subsequently, a photosensitive conductive paste layer is applied and formed on the insulating layer to form a coil conductor layer and an external electrode conductor layer by a photolithography step. Specifically, the photosensitive conductive paste containing Ag as a main metal component is applied onto the insulating layer by screen printing to form the photosensitive conductive paste layer. Ultraviolet rays etc. are then applied through a photomask to the photosensitive conductive paste layer and followed by development with an alkaline solution etc. As a result, the coil conductor layer and the external electrode conductor layer are formed on the insulating layer. At this step, the coil conductor layer and the external electrode conductor layer can be drawn into a desired pattern with the photomask. In this case, the layers are formed such that the shortest distance between the outer circumferential edge of the coil conductor layer (coil) and the outer edge of the insulating layer becomes smaller than the width of the external electrode conductor layer (external electrode).

Subsequently, a photosensitive insulating paste layer is applied and formed on the insulating layer to form an insulating layer provided with an opening and a via hole by a photolithography step. Specifically, a photosensitive insulating paste is applied onto the insulating layer by screen printing to form the photosensitive insulating paste layer. Ultraviolet rays etc. are then applied through a photomask to the photosensitive insulating paste layer and followed by development with an alkaline solution etc. At this step, the photosensitive insulating paste layer is patterned to provide the opening above the external electrode conductor layer and the via hole at an end portion of the coil conductor layer with the photomask.

Subsequently, a photosensitive conductive paste layer is applied and formed on the insulating layer provided with the opening and the via hole to form a coil conductor layer and an electrode conductor layer by a photolithography step. Specifically, a photosensitive conductive paste containing Ag as a main metal component is applied onto the insulating layer so as to fill the opening and the via hole by screen printing to form the photosensitive conductive paste layer. Ultraviolet rays etc. are then applied through a photomask to the photosensitive conductive paste layer and followed by development with an alkaline solution etc. This leads to the formation of the external electrode conductor layer connected through the opening to the external electrode conductor layer on the lower layer side and the coil conductor layer connected through the via hole to the coil conductor layer on the lower layer side.

The steps of forming the insulating layer as well as the coil conductor layer and the external electrode conductor layer as described above are repeated to form a coil made up of the coil conductor layers formed on a plurality of the insulating layers and external electrodes made up of the electrode conductor layers formed on the insulating layers. An insulating layer is further formed by repeatedly applying an insulating paste by screen printing onto the insulating layer with the coil and the external electrodes formed. This insulating layer serves as an outer-layer insulating layer located outside coil conductor layers. It is noted that if sets of coils and external electrodes are formed in a matrix shape on the insulating layers at the steps described above, a mother laminated body can be acquired.

Subsequently, the mother laminated body is cut into a plurality of unfired laminated bodies by dicing etc. In the step of cutting the mother laminated body, the external electrodes are exposed from the mother laminate on a cut surface formed by cutting. At this step, if a cut deviation occurs in a certain amount or more, the outer circumferential edges of the coil conductor layers formed at the steps appear on an end surface or a bottom surface.

The unfired laminated bodies are fired under predetermined conditions to acquire element bodies including the coils and the external electrodes. These element bodies are subjected to barrel finishing for polishing into an appropriate outer shape size, and portions of the external electrodes exposed from the laminated bodies are subjected to Ni plating having a thickness of 2 μm to 10 μm and Sn plating having a thickness of 2 μm to 10 μm. Through the steps described above, electronic components of 0.4 mm×0.2 mm×0.2 mm are completed.

Subsequently, the appearance inspection of the electronic components is performed to sort electronic components with the outer circumferential edges of the coil conductor layers exposed on or seen through the end surfaces or the bottom surface. For this step, an overlapping width between the coil and the first portion/second portion, a threshold value for sorting in the appearance inspection, etc. are properly set with respect to designed values of the minimum widths of the first portion/second portion of the external electrodes of the electronic component, and the shortest distances between the outer circumferential edge and the end surface/bottom surface of the element body. As a result, an electronic component with adhesivity reduced between the external electrodes and the element body can be sorted. Therefore, the risk of occurrence of defects in the market can be reduced.

The construction method of forming the electronic component is not limited to the above method and, for example, the method of forming the coil conductor layers and the external electrode conductor layers may be a printing lamination construction method of a conductive paste using a screen printing plate opened in a conductor pattern shape, may be a method using etching or a metal mask for forming a pattern of a conductive film formed by a sputtering method, a vapor deposition method, pressure bonding of a foil, etc., or may be a method in which formation of a negative pattern is followed by formation of a conductor pattern with a plating film and subsequent removal of unnecessary portions as in a semi-additive method. Alternatively, the method may be achieved by using a method of transferring onto an insulating layer a conductor patterned on a substrate different from the insulating layer serving as the element body of the electronic component.

The method of forming the insulating layers as well as the openings and the via holes is not limited to the above method and may be a method in which after pressure bonding, spin coating, or spray application of an insulating material sheet, the sheet is opened by laser or drilling.

The insulating material of the insulating layers is not limited to the ceramic material such as glass and ferrite as described above and may be an organic material such as an epoxy resin, a fluororesin, and a polymer resin, or may be a composite material such as a glass epoxy resin and, if the electronic component is used for a matching coil at high frequency, a material low in dielectric constant and dielectric loss is desirable.

The size of the electronic component is not limited to the above description. The method of forming the external electrodes is not limited to the method of applying plating to the external electrodes exposed by cutting, and may be a method in which a coating film is further formed by dipping of a conductor paste, a sputtering method, etc. on the external electrodes exposed by cutting, or plating may further be applied onto the coating film. As in the case of forming the coating film or plating, the external electrodes may not be exposed to the outside of the electronic component. Therefore, the exposure of the external electrodes from the element body means that the external electrodes have portions not covered with the element body and the portions may be exposed to the outside of the electronic component or may be exposed to other members.

The invention claimed is:

1. An electronic component comprising:

an element body including a first end surface and a second end surface opposite to each other and a bottom surface connecting to the first end surface and the second end surface;

a coil provided in the element body; and a first external electrode and a second external electrode provided in the element body and electrically connected to the coil, wherein the coil includes coil conductor layers that are electrically connected to each other along a lamination direction, the coil conductor layers include a conductor portion and end portions at each ends of the conductor portion, with each end portion having a width larger than the conductor portion, wherein in a first cross-section intersecting with the first end surface, the second end surface, and the bottom surface of the element body:

the first external electrode has a first portion extending along the bottom surface of the element body and a second portion extending along the first end surface of the element body, the first portion of the first external electrode and the second portion of the first external electrode being embedded in the element body, the second external electrode has a first portion extending along the bottom surface of the element body and a second portion extending along the second end surface of the element body, the first portion of the second external electrode and the second portion of the second external electrode being embedded in the element body, the coil is disposed such that an outer circumferential edge of the coil faces the bottom surface of the element body, and a shortest distance between the outer circumferential edge of the coil and the bottom surface of the element body is smaller than a minimum width of the first portion of the first external electrode in a direction orthogonal to the bottom surface, and wherein in the first cross-section of the element body:

a first tangent line is tangent to the first portion of the first external electrode at a first point on an edge facing the coil and to the second portion of the first external electrode at a second point on an edge facing the coil, a second tangent line is tangent to the first portion of the second external electrode at a first point on an edge facing the coil and to the second portion of the second external electrode at a second point on an edge facing the coil, the first tangent line and the second tangent line do not cross the conductor portion of at least one of the coil conductor layers, and a portion of one end of at least one of the coil conductor layers is between the first portions of the first and second external electrodes, and the other end of the at least one coil conductor layer is not between the first portions of the first and second external electrodes and is between the second portions of the first and second external electrodes.

2. The electronic component according to claim 1, wherein the first tangent line and the second tangent line do not cross any part of each of the coil conductor layers located between two ends of each respective coil conductor layer.

3. The electronic component according to claim 1, wherein two coil conductor layers of the coil conductor layers adjacent in the lamination direction of the coil conductor layers have the same shape.

4. An electronic component comprising:

an element body including a first end surface and a second end surface opposite to each other and a bottom surface connecting to the first end surface and the second end surface;

a coil provided in the element body; and a first external electrode and a second external electrode provided in the element body and electrically connected to the coil, wherein the coil includes coil conductor layers that are electrically connected to each other along a lamination direction, wherein in a first cross-section intersecting with the first end surface, the second end surface, and the bottom surface of the element body:

the first external electrode has a first portion extending along the bottom surface of the element body and a second portion extending along the first end surface of the element body, the first portion of the first external electrode and the second portion of the first external electrode being embedded in the element body, the second external electrode has a first portion extending along the bottom surface of the element body and a second portion extending along the second end surface of the element body, the first portion of the second external electrode and the second portion of the second external electrode being embedded in the element body, the coil is disposed such that an outer circumferential edge of the coil faces the bottom surface of the element body, and a shortest distance between the outer circumferential edge of the coil and the bottom surface of the element body is smaller than a minimum width of the first portion of the first external electrode in a direction orthogonal to the bottom surface, wherein in the first cross-section of the element body, a part of one of the coil conductor layers that faces the first external electrode is inclined relative to the first portion of the first external electrode and the second portion of the first external electrode without having a portion that is parallel to the first portion of the first external electrode, and without having a portion that is parallel to the second portion of the first external electrode, wherein in the first cross-section of the element body, a part of the one of the coil conductor layers that faces the second external electrode is inclined relative to the first portion of the second external electrode and the second portion of the second external electrode without having a portion that is parallel to the first portion of the second external electrode, and without having a portion that is parallel to the second portion of the second external electrode, and wherein in the one of the coil conductor layers, distances in a direction orthogonal to the first end surface between the parts of the coil conductor layer and the second portion of the first external electrode change along the one of the coil conductor layers in a direction orthogonal to the bottom surface.

5. The electronic component according to claim 4, wherein two coil conductor layers of the coil conductor layers adjacent in the lamination direction of the coil conductor layers have the same shape.

6. The electronic component according to claim 4, wherein in the one of the coil conductor layers, distances in the direction orthogonal to the bottom surface between the parts of the coil conductor layer and the first portion of the first external electrode are not constant, and in the one of the coil conductor layers, distances in a direction orthogonal to the first end surface between the parts of the coil conductor layer and the second portion of the first external electrode are not constant.

7. The electronic component according to claim 4, wherein in the one of the coil conductor layers, a bottom portion of the coil conductor layer extending along the bottom surface is shorter than an upper portion of the coil conductor layer extending along a surface opposite to the bottom surface.

8. An electronic component comprising:

an element body including a first end surface and a second end surface opposite to each other and a bottom surface connecting to the first end surface and the second end surface;

a coil provided in the element body; and a first external electrode and a second external electrode provided in the element body and electrically connected to the coil, wherein the coil includes coil conductor layers that are electrically connected to each other along a lamination direction, the coil conductor layers include a conductor portion and end portions at each ends of the conductor portion, with each end portion having a width larger than the conductor portion, wherein in a first cross-section intersecting with the first end surface, the second end surface, and the bottom surface of the element body:

the first external electrode has a first portion extending along the bottom surface of the element body and a second portion extending along the first end surface of the element body, the first portion of the first external electrode and the second portion of the first external electrode being embedded in the element body, the second external electrode has a first portion extending along the bottom surface of the element body and a second portion extending along the second end surface of the element body, the first portion of the second external electrode and the second portion of the second external electrode being embedded in the element body, the coil is disposed such that an outer circumferential edge of the coil faces the bottom surface of the element body, and a shortest distance between the outer circumferential edge of the coil and the bottom surface of the element body is smaller than a minimum width of the first portion of the first external electrode in a direction orthogonal to the bottom surface, wherein two coil conductor layers of the coil conductor layers directly adjacent in the lamination direction of the coil conductor layers have the same shape, and wherein a portion of one end of at least one of the coil conductor layers is between the first portions of the first and second external electrodes, and the other end of the at least one coil conductor layer is not between the first portions of the first and second external electrodes and is between the second portions of the first and second external electrodes.

9. The electronic component according to claim 8, wherein in all of the coil conductor layers, two coil conductor layers directly adjacent in the lamination direction of the coil conductor layers have the same shape.

* * * * *